July 14, 1931.  E. WITTE  1,814,069

CORN PLANTER

Filed Nov. 6, 1926

Inventor:
EDWARD WITTE,
By John N. Bruninga
His Attorney.

Patented July 14, 1931

1,814,069

UNITED STATES PATENT OFFICE

EDWARD WITTE, OF CRESCENT CITY, ILLINOIS

CORN PLANTER

Application filed November 6, 1926. Serial No. 146,628.

This invention relates to corn planters, and more particularly to means for controlling the seed dropping mechanism thereof. This application is a continuation of application Serial Number 22,564, filed April 13, 1925, as to the subject matter common to both applications.

In the ordinary corn planter, seed dropping mechanism is provided by means of which a predetermined number of seeds is deposited in a furrow made by the planter and suitably covered with soil. Mechanism is provided whereby the deposit of seeds is performed at regular intervals during the travel of the machine. This mechanism includes what is termed "a check-rower." The check-rower usually includes releasing mechanism for the seed plate which counts out and releases a certain number of seeds and for the seed dropper which accomplishes the dropping of the seeds, this releasing mechanism being operated periodically by a series of knots or buttons on a socalled check wire stretched along the field and engaging a suitable manipulative element on the mechanism. As the corn planter travels along the field, the knots on the wire are drawn successively past the check-rower and each knot operates the mechanism to drop seeds in a hill.

As the planter approaches the edges of the field, a certain space must be left to allow for turning the team and the planter. The check-rower is incapable of dropping seeds at the required regular intervals in this part of the field since, during the turning operation, the wire cannot be used to operate the same for the reason that the wire knots cannot be aligned with the rows.

One of the objects of this invention, therefore, is to provide mechanism which will enable the planter to be used for seeding that part of the field in which the checker-rower cannot be employed.

Another object of this invention is to provide mechanism whereby the seed dropping mechanism may be operated at regular intervals independently of the check-rower.

Another object is to provide such mechanism which may be thrown into and out of operation at will, and more particularly to initially drop the seeds on the rows or correct for errors in spacing or accumulations of such errors.

Figure 1:
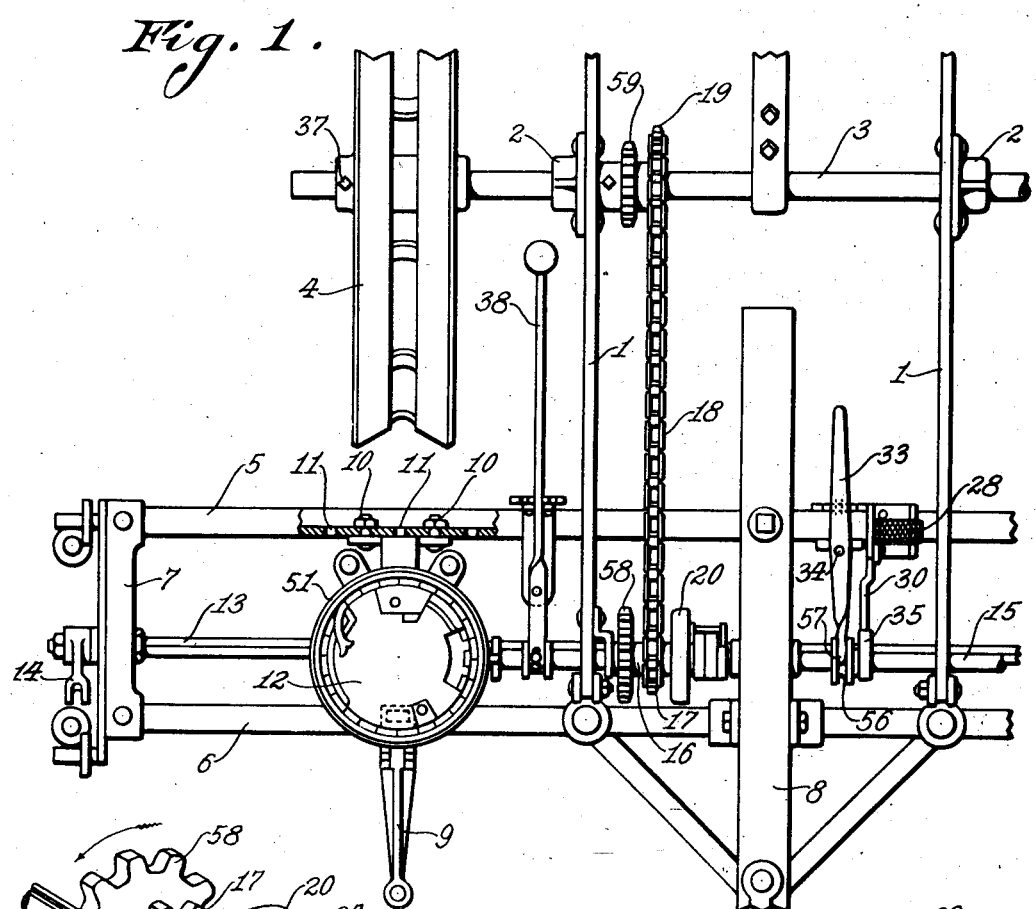
Figure 2:
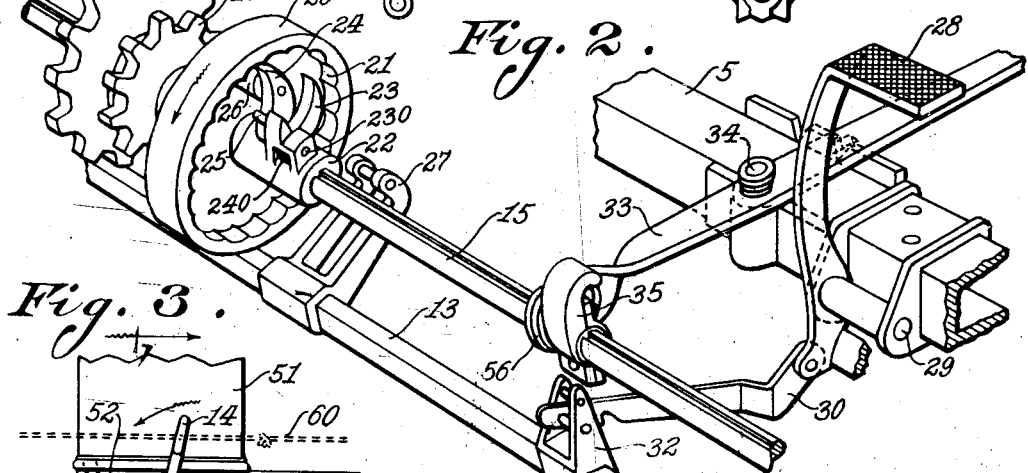
Figure 3:
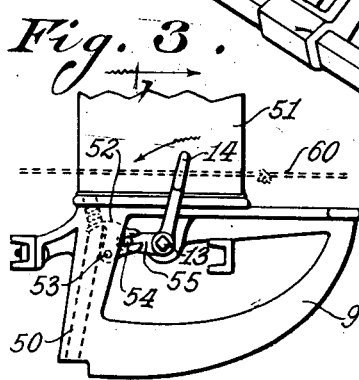

Further objects will appear from the following description taken in connection with the accompanying drawings, in which Figure 1 is a plan view of part of a corn planter embodying this invention;

Figure 2 is a fragmentary perspective view showing the seed dropper clutch and the means for releasing the same in accordance with this invention; and Figure 3 is a view taken from the left-hand end of Figure 1 and showing the seed dropping valve.

Referring to the accompanying drawings, 1 designates the frame of the planter which is provided with suitable bearings 2 in which an axle 3 is adapted to turn. Suitable ground wheels 4, only one of which is shown, support the frame and one of them turns the axle 3 during travel of the machine. The forward part of the frame is carried upon a cross-frame consisting of a rear bar 5 and a front bar 6 joined by end brackets 7, only one of which is shown. The tongue 8 is attached to the bars 5 and 6. The cross-frame is carried upon a pair of runners or plows 9, only one of which is shown, adapted to open a furrow in which the seeds are deposited. The runners 9 may be adjustably attached to the frame by means of bolts 10 or other suitable fastenings, extra bolt holes 11 being provided in order to permit lateral adjustment of the runners on the cross-frame so as to provide for adjusting the spacing between the planted rows. A suitable seed hopper 51 provided with a suitable seed plate 12 is mounted over each of the runners 9.

Extending endwise of the cross-frame is a rock shaft 13 mounted in suitable bearings in the brackets 7 and provided at its ends with forked levers 14 adapted to engage the knotted check wire 60. This shaft is yieldingly maintained with the levers in forward position, as shown in Figure 1, by a suitable spring, not shown in the drawings. Suitably mounted above the rock shaft 13 is a seed plate shaft 15 suitably connected to operate the seed plate 12 by rotating said shaft. Rotatably mounted on the shaft 15 is a short sleeve 16 carrying a sprocket 17 driven by a chain 18 from a sprocket 19 on the axle 3. Travel of the planter keeps the sleeve 16 in rotation by means of these connections. Fixed to the sleeve 16 is a clutch member 20 in the form of a cup-shaped disc internally scalloped, as shown at 21. This disc rotates with the sleeve. Fixed to the seed plate 15 is a hub 22, which has fixed thereto a stop-finger 23 and which has pivoted thereon at 230 a clutch-finger 24. The finger 24 is urged by a spring 240 on the pivot pin 230, in the direction of rotation of the disc 20, as shown by the arrow in Figure 2, being stopped in its up-right position, as shown in Figure 2, by a stop 25 on the hub 22. The finger 24 carries a roller 26 adapted to engage one of the scallops 21 when in up-right position. When so engaged the hub 22 is locked to the disc 20 so as to be carried in rotation thereby. As such rotation continues under normal conditions, the finger 24 will engage a latch 27 mounted in proper position on the rock shaft 13 and normally in the path of the fingers 24 and 23. As the finger 24 engages the latch 27, the finger is drawn backward so as to free the roller 26 from its scallop 21, thereby releasing the hub 22 and the shaft 15 from driving connections with the disc 20. Further movement of the shaft 15 will bring the finger 23 into engagement with the latch 27 so as to stop and hold the shaft 15.

It will be seen that this mechanism provides that the shaft 15 is permitted to make only one revolution before it is stopped by the latch 27. The check-rower mechanism when operated by the knotted wire operates to rock the shaft 13 so as to move the latch 27 downwardly out of engagement with the fingers 23 and 24, thereby releasing the finger 24 which operates the clutch 20 to lock the shaft 15 to the sleeve 16. When this is done, the shaft 15 is rotated through one revolution so as to operate the seed plates to release the required number of seeds. In the meantime the knot on the check wire has quickly passed the fork 14, so that the latch 27 on the shaft 13, shifted and released by the check wire, is permitted to resume its normal position in the path of the fingers 23 and 24 before these fingers have made a complete revolution; accordingly, the fingers again engage and are arrested by the latch so as to stop the shaft 15 after one revolution.

At the rear of the plow 9 a chute 50 is provided, leading from the seed hopper 51 down to the heel of the plow 9, which delivers the seeds to the furrow. At the head of the chute 50 the same is closed by a valve 52 pivoted at 53 on the plow and operated by a pin 54 on an arm 55 on the rock shaft 13. The seeds dispensed by the operation of the seed plate 12 are collected above the valve 52 to be dropped into the furrow when the check-rower mechanism operates said valve. The valve 52 thus constitutes a seed dropper which collects and holds the seeds dispensed by the seed plate, and then drops the collected seeds into the furrow when operated by the check row wire.

All of the above described mechanism is well known in the art and the particular mechanism described is that found on the well known Black Hawk type of planter.

Such a planter is usually provided with manual means for operating the seed plates. This may take the form of a foot pedal 28 pivoted at 29 on the cross-frame and connected to a link 30 extending forwardly therefrom and connected to a lever 32 on the rock shaft 13. By pushing forwardly on the pedal 28, the link 30 is drawn backward so as to rock the shaft 13, thereby drawing back the latch 27 and releasing the clutch mechanism to operate the seed plate and the seed dropper. The link 30 is ordinarily made detachable from the lever 32 so that it may be thrown out of action when desired.

In accordance with this invention, a cam or finger 35 is mounted on the shaft 15; in the illustrated embodiment, this cam or finger is splined to the shaft 15 so as to be slidable therealong. This cam is accordingly provided with a collar 56 engaged between a pair of fingers 57 on the end of a shifting lever 33 pivoted at 34 on the cross frame. By these means the cam 35 may be shifted to such a position on the shaft 15 that as said shaft rotates, the cam will engage the end of the lever 32 to rock the same rearwardly in time to draw back the latch 27 as the fingers 23 and 24 approach the same, holding the latch in withdrawn position until said fingers have passed so as to render the latch inoperative for stopping the movement of the seed shaft 15. When the cam 35 is in position to engage the lever 32, therefore, the shaft 13 will be rocked at every revolution of the shaft 15 so as to keep the latch 27 from stopping the shaft 15. During such operation the seed dispensing and dropping mechanisms will be operated to drop seeds at regular intervals during the travel of the planter. The relative sizes of the sprockets 19 and 17 may be so adjusted that the interval between seed droppings under these conditions will be just equal to the lateral spacing between the plows 9, so that seeds may be dropped in the established rows while driving the planter cross-wise thereof.

In the operation of this device, the planter is driven across the field through the space above mentioned at the end of the rows which must be allowed for turning the planter and which could not be seeded during regular operation on account of the inoperativeness of the check-rower in that space. The planter is driven crosswise of the rows to such a position that the seed dropping chute is directly over a row. At this point the foot pedal 28 is operated to drop a hill of seeds, and the planter is driven on a foot or two, after which the cam 35 is shifted into alinement with the lever 32 by means of the lever 33. The mechanism is now arranged to drop seeds regularly as the planter is driven across the field and when adjustments have been properly made, seeds will be dropped in each row so as to check with the seeds dropped during the regular planting operations.

The automatic dropping mechanism can be readily adjusted to conform to the spacing of the plows by the provision of a proper sprocket 19 as heretofore described. Extra sets of sprockets, such as 58 and 59, may be provided for extra spacings. This adjustment can furthermore be accomplished by adjusting the spacing of the plows on account of the adjustable connection between the plows and the bars 5 and 6 through the medium of the bolts 10 and the perforations 11. It will be noted in this connection that the wheels 4 may also be adjustably spaced on the shaft 3 by the provision of the set-screws 37 attaching these wheels to the shaft 3. It will be understood, of course, that although only one plow and one wheel has been shown, there are in reality two plows. The planter may as usual be provided with a lever 38 for adjusting the number of seeds which are dropped in a hill, but this mechanism may be of any suitable or usual construction, a suitable one being illustrated in United States Patent No. 918,983, granted April 20, 1909, which illustrates partly the mechanism of the well known Black Hawk planter.

That the machine will accomplish its purpose will be clear from the following additional description. Let us assume that the arm 32 has been drawn back when the seed chute 50 is over a row so as to rock the shaft 13 and open the valve 53 to deposit the seeds, previously measured out by the seed plate, on that row; this will also serve to draw back the latch 27 to release the fingers 23 and 24 thereby clutching the clutch disc 20 and the sprocket 17 to the shaft 15. Since the shaft 15 is now connected to the wheel shaft through the train 20, 17, 18 and 19, the clutch disc 20 will travel with the wheel until the fingers 23 and 24 have made one complete revolution. By suitable proportioning of the diameters of the sprockets 17 and 19 with respect to the diameter of the wheel 4 and the spacing of the plows, the fingers 23, 24 can be made to pass through one complete revolution by the time that the seed chute arrives at the next row. At this point the cam or finger 35 again engages the arm 32 so as to rock the shaft 13 and thereby shift the valve 52 in order to deposit on that next row the seed accumulated over the valve by rotation of the seed plate during that revolution of the shaft 15. This rocking of the shaft 13, however, again moves the latch 27 out of the path of the fingers 23, 24 so as to permit them to make another revolution.

The action is, therefore, not like that taking place in drilling; for during drilling the arm is shifted by the pedal 28 so as to permanently hold the rock shaft 13 in such a position as to hold the valve open as well as hold the latch back; accordingly, the seeds are dropped through the chute one by one as the seed plate pockets move over the chute. In accordance with this invention, however, the valve is not held open, but is opened and closed as the planter moves over the ground to distances between the rows, while the seeds are accumulated between droppings. It is not ordinarily necessary to change gears when conversion from check-row to cross-row dropping takes place; for during check-row dropping the seeds are measured out over the valve between knots and dropped at the knots, while during cross-row dropping the seeds are again measured out over the valve during a revolution of the cam or finger 35 and dropped at the end of each revolution. The cam or finger 35 can be shifted at any time during its revolution; as, however, previously described, it is shifted after the first hill has been dropped and after the planter has been driven forward a few feet (but less than the distance between two rows) so that this cam will have fully passed the arm 32 especially if this arm should have returned to its forward position as shown in Figure 2.

It will be seen that this invention provides mechanism whereby the end spaces of the field which cannot be seeded by the ordinary check-rower can be planted subsequently to the regular planting and in rows such as to check with the original planting. The construction is, however, such that not only may the planter be converted to automatically drop seeds in check rows by driving the planter across the rows, but the foot dropper may also be employed, if desired. If the field is wide, certain errors may creep in when the automatic drop is employed; this error is, however, no greater than when the foot or even a hand drop is employed. Furthermore at intervals the planter may be stopped with the seed chute of the plow on a row and the clutch may be readjusted to be shifted at that point. This will take care of any possible discrepancies due to inaccuracy of gearing or slippage of wheels.

This device is also useful in starting the planting of a field before the check wire has been staked. The planter may be driven down the field and the first two rows planted by the automatic mechanism controlled by the cam 35 while the check wire is being unreeled. In this way valuable time is saved by unreeling the wire and a similar operation may be performed at the end of the field when the last two rows may be planted while the wire is being reeled up. Furthermore in such emergencies as occasionally occur when the check wire is accidentally pulled loose, the remainder of the row may be planted automatically by the operation of the cam 35 so that time is saved in stopping to re-stake the wire.

While the mechanism has been shown as applied to a particular type of planter, it is to be understood that it is not limited to such a type, but this mechanism can be applied to various types of planters in the art. It is further obvious that various changes may be made in details of construction without departing from the spirit of this invention; it is, therefore, to be understood that this invention is not to be limited to the specific details shown and described.

Having thus described the invention, what is claimed is:

1. A corn planter having ground wheels, a seed plate driven from a ground wheel through a clutch, a seed dropper, check-rower mechanism operable by a check wire and connected to shift said clutch and said dropper, and actuating means operable by a ground wheel and connected to shift said dropper at definite intervals and render said clutch operative independently of the wire.

2. A corn planter having ground wheels, a seed plate driven from a ground wheel through a clutch, a seed dropper, check-rower mechanism including a rock shaft having a check wire engageable fork and constructed and arranged to shift said clutch and said dropper, an actuator driven by a ground wheel and adapted to co-operate with said rock shaft, and means for adjusting said actuator to shift said rock shaft independently of the wire.

3. A corn planter having ground wheels, a seed plate, a shaft driven from a ground wheel, a clutch on said shaft connected with said seed plate, a seed dropper, check-rower mechanism operable by a check wire and constructed and arranged to shift said clutch and said dropper, and means operable by said shaft and adapted to operate said mechanism independently of the wire.

4. A corn planter having ground wheels, a seed plate, a shaft driven from a ground wheel, a clutch on said shaft connected with said seed plate, a seed dropper, check-rower mechanism operable by a check wire and constructed and arranged to shift said clutch and said dropper, an actuator on said shaft adapted to operate said mechanism independently of the wire, and means for rendering said actuator inoperative.

5. A corn planter having ground wheels, a seed plate, a shaft driven from a ground wheel, a clutch on said shaft connected with said seed plate, a seed dropper, check-rower mechanism operable by a check wire and constructed and arranged to shift said clutch and said dropper, pedal means connected for operating said mechanism independently of the wire, and an actuator on said shaft shiftable to operative relation with said pedal means to operate said mechanism at definite intervals independently of the wire.

6. A corn planter having ground wheels, a seed plate driven from a ground wheel through a clutch, a seed dropper, check-rower mechanism operable by a check wire and connected to shift said clutch and said dropper, actuating means operable by a ground wheel and connected to shift said dropper at definite intervals and render said clutch operative independently of the wire, and means for shifting said actuating means so as to selectively render it effective and ineffective.

7. A corn planter having ground wheels, a seed plate driven from a ground wheel through a clutch, a seed dropper, check-rower mechanism operable by a check wire and connected to shift said clutch and said dropper, actuating means operable by a ground wheel and connected to shift said dropper at definite intervals and render said clutch operative independently of the wire, and means connected to shift said dropper and render said clutch operative independently of the wire and said actuating means.

8. A corn planter having ground wheels, a seed plate, driven from a ground wheel through a clutch, a seed dropper, a rock shaft having a check wire-engageable fork and connected to shift said clutch and said dropper, and actuating means operable by a ground wheel and connected to shift said rock shaft at definite intervals independently of the wire.

9. A corn planter having ground wheels, a seed plate, a shaft driven from a ground wheel through a clutch, a seed dropper, a rock shaft having a check wire-engageable fork and connected to shift said clutch and said dropper, and an actuator on said driven shaft adapted to shift said rock shaft independently of the wire.

10. A corn planter having ground wheels, a seed plate, a shaft driven from a ground wheel through a clutch, a seed dropper, a rock shaft having a check wire-engageable fork and connected to shift said clutch and said dropper, an actuator on said driven shaft adapted to shift said rock shaft independently of the wire, and means connected to shift said rock shaft independently of the wire and said actuator.

In testimony whereof I affix my signature this 3rd day of November, 1926.

EDWARD WITTE.